Patented Dec. 18, 1945

2,391,137

UNITED STATES PATENT OFFICE 2,391,137

MONOAZO HETERO-OXYGEN COMPOUNDS

Jakob Danuser, Arlesheim, and Rudolf von Capeller, Riehen, Switzerland, assignors to the firm Society of Chemical Industry in Basle, Basel, Switzerland No Drawing. Application September 11, 1943, Serial No. 502,028. In Switzerland October 12, 1942

5 Claims. (Cl. 260—152)

In U. S. Patent No. 1,765,142 it has been recommended to dye acetate rayon with monoazo-dyestuffs obtained from diazotized amines of the benzene series and hydroxy compounds of the benzene series which couple in ortho-position to the hydroxyl group, for example the coupling product from diazotized 1-amino-4-acetyl-aminobenzene and para-cresol. The dyeings thus obtained are distinguished by a good fastness to light, combined with a good wet fastness. In U. S. Patent No. 1,893,543 it has been shown that when using, as diazotized amines of the benzene series, amines which contain an —O-alkyl group in 4-position to the amino group, there are obtained dyestuffs, such as the coupling product from diazotized paraanisidine and para-cresol, the dyeings of which on acetyl cellulose possess a fastness to light which is considerably superior to that of the dyeings obtained according to Patent No. 1,765,142. The wet fastness properties of the dyeings thus obtained, especially their fastness to ironing and their fastness to sublimation, however, do not satisfy present day requirements.

It has now been found that dyestuffs are obtained in which the excellent fastness to light of the dyestuffs of Patent No. 1,893,543 is combined with the other good wet fastness properties of the dyeings produced with the dyestuffs obtainable according to Patent No. 1,765,142, if diazo compounds of aromatic amines of the benzene series which contain in 4-position to the amino group an O-alkylene group linked by its oxygen atom to the benzene ring which alkylene group belongs itself to a heterocyclic ring fused on in 3- and 4-positions of the benzene ring, that part of the heterocyclic ring which is not fused on at the benzene ring consisting of 2-oxygen atoms and at least 1 and not more than 2 carbon atoms and containing the 2-oxygen atoms separated from each other by at least one carbon atom, are caused to react with hydroxy compounds of the benzene series which couple in ortho position to the hydroxyl group.

The dyestuffs thus obtained correspond to the general formula $$R_1-N=N-R_2$$

wherein $R_1$ stands for an aromatic nucleus of the benzene series which contains in 4-position to the azo group an O-alkylene group linked by its oxygen atom to the benzene ring which alkylene group belongs to a heterocyclic ring fused on in 3- and 4-positions of the benzene ring that part of the heterocyclic ring which is not fused on at the benzene ring consisting of 2 oxygen atoms and at least 1 and not more than 2 carbon atoms and containing the 2 oxygen atoms separated from each other by at least one carbon atom and $R_2$ stands for a benzene nucleus which contains a hydroxyl group in ortho-position to the azo group, and carries a substituent in 4-position to this hydroxyl group which causes coupling in 2-position.

The new dyestuffs are yellow to brown powders which are sparingly soluble in water, but are soluble in organic solvents, for example acetic ether, to yellow to orange solutions. From a finely dispersed aqueous suspension they have an excellent affinity for esters and ethers of cellulose, especially acetate rayon, and they may further be used for dyeing synthetic fibers of animal character, such as superpolyamides and superpolyurethanes. The valuable properties of the new dyestuffs are surprising because it was not to be expected that by using the ethers of Patent No. 1,893,543 converted into heterocyclic rings, dyestuffs of equal affinity could be obtained, and that the dyeings obtained therefrom would possess good wet fastness properties in spite of the remaining ethereal character of the dyestuffs.

The aromatic amines of the benzene series used in this specification whose nuclear carbon atoms standing in 3- and 4-positions to the amino group are constituents of the above characterized heterocyclic ring, are known in the literature or may be produced according to analogous processes described there. The corresponding nitro compounds are known in many instances; these may be converted into the amino compounds according to known methods. Among these compounds mention is made of the 4-aminopyrocatechin methylene ether, obtainable by reduction from 4-nitropyrocatechin methylene ether (cf. Beilstein, 4th Edition, vol. 19, pages 20), of the 4-nitro-5-brompyrocatechin methylene ether (cf. "Berichte," vol. 24, page 2593, of 1891) which is converted by reduction into the 4-amino-5-bromopyrocatechin methylene ether; of the 4-nitro-pyrocatechin ethylene ether (cf. "Annalen," vol. 280, page 206 of 1894), obtainable by reduction from the 4-aminopyrocatechin ethylene ether; of the methylene ether of the 5-amino-2-hydroxy benzyl alcohol obtainable by treating para-nitrophenol with formaldehyde and sulfuric acid (cf. "Annalen," vol. 330, page 91 of 1904) and subsequent reduction of the nitro group; of the methylene ether of 5-amino-2-hydroxy-3-methylbenzyl alcohol, which may be produced over 5-nitro-2-hydroxy-3-methylbenzyl alcohol methylene ether (cf. "Annalen," vol. 330, page 94 of 1904) from the 1-hydroxy-2-methyl-4-nitrobenzene; of the methylene ether of 5-amino-2-hydroxy-3-methoxybenzyl alcohol, obtainable in analogous manner from 1-hydroxy-2-methoxy-4-nitrobenzene, and so forth.

As hydroxy compounds of the benzene series which couple in ortho-position to the hydroxy group with diazo compounds there may be mentioned:—1-hydroxy - 4 - methylbenzene, 1-hydroxy-3:4 - dimethylbenzene, 1-hydroxy-4-chloro-3 - methylbenzene, 1-hydroxy - 3 - chloro-4-methylbenzene, 1 - hydroxy-3-methyl-4-acetylaminobenzene, 1-hydroxy-4 - methyl - 3-acetylaminobenzene, 1-hydroxy-4-methyl-3 - aminobenzene, 1-hydroxy-4-methoxybenzene, and the like.

The following examples illustrate the invention, but are not to be regarded as limiting it in any way, the parts being by weight:

*Example 1*

15.1 parts of 4-aminopyrocatechin ethylene ether are suspended in about 100 parts of water and diazotized with 25 parts of hydrochloric acid of 30 per cent. strength and 7 parts of sodium nitrite. The cold solution of the diazonium compound is added to a cold solution containing 10.8 parts of 1-hydroxy-4-methylbenzene, 10 parts of sodium hydroxide solution of 30 per cent. strength and 15 parts of sodium carbonate.

The dyestuff of the formula

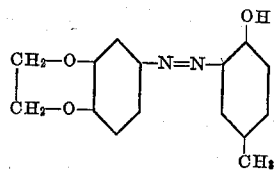

is precipitated and, when coupling is complete, filtered and washed. When dry it is a yellow powder which dissolves in organic solvents, such as alcohol, acetic ether, to a yellow solution. When ground with a dispersing agent, for example sulfite cellulose waste liquor, there is obtained a fine paste which yields a fine suspension in water, from which acetate rayon is dyed fast yellow shades.

The procedure is similar with the other diazotizing components cited in the introduction, for example 4-aminopyrocatechin methylene ether. There is then obtained a product of the formula

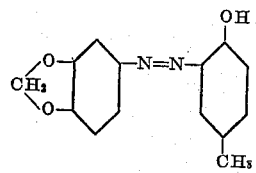

Instead of 1-hydroxy-4-methylbenzene there may also be used the other hydroxybenzenes named in the introduction, for example 1-hydroxy-3:4 - dimethylbenzene or 1-hydroxy-3-chloro-4-methylbenzene.

*Example 2*

15.1 parts of the methylene ether of 5-amino-2-hydroxybenzyl alcohol are diazotized in aqueous solution with 25 parts of hydrochloric acid of 30 per cent. strength and 7 parts of sodium nitrite. A solution is prepared from 10.8 parts of 1-hydroxy-4-methylbenzene in 10 parts of sodium hydroxide solution of 30 per cent strength and 15 parts of sodium carbonate and about 100 parts of water. This solution cooled with ice is mixed with the diazonium solution obtained above and the whole is stirred until the formation of dyestuff is complete. The dyestuff is then filtered and washed.

The dyestuff of the formula

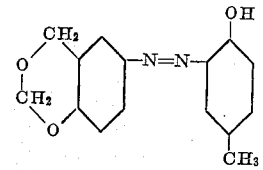

has similar properties like the dyestuff of Example 1. It dyes acetate rayon from a fine suspension pure yellow shades of good fastness properties. A similar dyestuff is formed from the diazotized 5-amino-2-hydroxy - 3-methoxybenzyl alcohol which corresponds to the formula

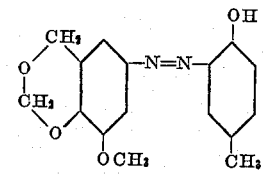

Instead of 1-hydroxy-4-methylbenzene there may be used with similar results also other hydroxybenzenes, for example those indicated in the foregoing introduction, e. g. 1-hydroxy-3:4-dimethylbenzene, 1-hydroxy-4-methyl-3-acetylaminobenzene and the like.

*Example 3*

10 parts of the dyestuff of the first paragraph of Example 2 are ground to a homogeneous paste containing 20 per cent. of dyestuff with addition of a suitable dispersing agent, such as Turkey red oil, sulfite cellulose waste liquor, sulfonation products of the residues of the benzalde-manufacture. One part of this paste is intimately mixed with 10 parts of water of 50° C. and so many parts of a concentrated soap solution that the dyebath prepared therefrom corresponds to a soap solution of 0.2 per cent. strength. The mixture is then diluted with cold water to about 300 parts of water. 10 parts of acetate rayon yarn are introduced into the emulsion thus prepared and handled therein, the dyebath is heated within ¾ hour to 75° C. and dyeing is continued for about ¼ hour at this temperature. The material is then rinsed and brightened as usual. There are obtained fast vivid yellow shades which are not phototropic.

What we claim is:

1. The dyestuffs of the general formula

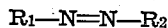

wherein $R_1$ stands for an aromatic nucleus of the benzene series which contains in 4-position to the azo group an O-alkylene group linked by its oxygen atom to the benzene ring, which alkylene group belongs to a heterocyclic ring fused on in 3- and 4-positions, that part of the heterocyclic ring which is not fused on consisting of 2 oxygen atoms and at least one and not more than 2 carbon atoms and containing the two oxygen atoms separated from each other by at least one carbon atom, and $R_2$ stands for a benzene nucleus which contains a hydroxyl group in ortho-position to the azo group and carries in 4-position to this hydroxyl group a substituent selected from the group consisting of methyl, methoxy and acetylamino.

2. The dyestuffs of the formula

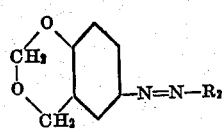

wherein R₂ stands for a benzene nucleus which contains a hydroxyl group in ortho-position to the azo group and carries in 4-position to this hydroxyl group a substituent selected from the group consisting of methyl, methoxy and acetylamino.

3. The dyestuff of the formula

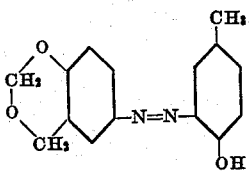

4. The dyestuff of the formula

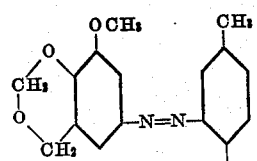

5. The dyestuff of the formula

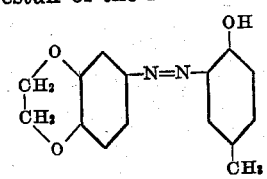

JAKOB DANUSER.
RUDOLF VON CAPELLER.